United States Patent [19]
Goldner

[11] 3,810,014
[45] May 7, 1974

[54] MEASURING INSTRUMENT

[75] Inventor: Heinz-Dieter Goldner, Schwalbach, Germany

[73] Assignee: Hartmann & Braun Aktiengesellschaft, Frankfurt/Main, Germany

[22] Filed: Nov. 20, 1972

[21] Appl. No.: 308,110

[30] Foreign Application Priority Data
Nov. 30, 1971 Germany............................ 2159284

[52] U.S. Cl. ....................... 324/130, 324/123 R
[51] Int. Cl. .......................... G01r 1/30, G01r 1/02
[58] Field of Search................ 324/130, 74, 123 R

[56] References Cited
UNITED STATES PATENTS
3,070,786  12/1962  MacIntyre........................ 324/130
3,311,826  3/1967   Galman........................... 324/123 R Primary Examiner—Alfred E. Smith
Assistant Examiner—Ernest F. Karlsen
Attorney, Agent, or Firm—Ralf H. Siegemund

[57] ABSTRACT

A variable is monitored and indicated by a measuring instrument incorporated in a circuit that uses the instrument for setting and adjustment of the reference input to be used later as trigger level. The reference is supplied to the first input of a differential amplifier while the variable is supplied to the second input of the amplifier. The output of the amplifier is connected with a reversing switch which in its one switching position couples the output to a tripping or triggering stage, possibly including a relay, and in the other one of its switching positions the output is coupled to the second input of the amplifier, so that the instrument actually indicates the reference value rather than the variable.

3 Claims, 2 Drawing Figures

MEASURING INSTRUMENT

BACKGROUND OF THE INVENTION

The present invention relates to a system for monitoring and supervising a variable in relation to a reference input of the system and operating on basis of feedback simulation, but without necessarily controlling the variable in a feedback system as far as the supervising and monitoring system is concerned.

Already known are systems in which the monitored variable is supplied to a measuring instrument which comprises a measuring scale including a plurality of index marks. If the indicator or pointer deflects to one of these marks, contacts are opened or closed to thereby release alarm signals. Such devices have the disadvantage that the contacts are subject to fouling which results in disorder of the system. Also, as a result of the usually rather slow motion of the deflecting indicator, the contact making is quite imprecise; the phenomenom commonly known as contact bouncing occurs here in a kind of slow motion version. Also used for controlling the signal indication are systems incorporating an inductive or optical pointer scanning which, however, requires external mechanical devices.

Further known are devices for comparing a reference input with a controlled variable by establishing the difference between a voltage representing the reference input and a voltage representing the variable. This comparison of voltages may be achieved by means of appropriately developed voltages across resistances, but such a system requires a reversing amplifier if the signs (polarity) of either one of the voltages is to be reversed. The desired-value voltage usually is drawn from a potentiometer which has to be calibrated in voltage units for the controlled variable. These circuits are used for regular feedback control. The invention does not directly relate to such feedback systems, but could find utility in such systems as special instrument package as will be explained.

SUMMARY OF THE INVENTION

The invention has as its object to obviate the above disadvantages and to provide an electronic apparatus for monitoring and supervising a variable which is indicated by a simple measuring instrument, and wherein a separate indication is made when the variable, for example, exceeds a critical value, but such indication is to be effected without the use of mechanical scanning of the indicator. Additionally, a reference input defining the critical value should be adjustable, but the adjustment should not require incorporating a potentiometer that has to be provided with a special calibrating scale.

In the system according to the invention, an adjustable reference input is supplied to a first input of a differential amplifier and the variable to be supervised is applied to the second input of the amplifier, as well as to the monitoring instrument. The output of the amplifier is connected to a reversing switch which in one position couples the amplifier output to a trigger stage and in the other switch position, the output is coupled to the second input of the amplifier by means of an appropriate input line. Upon changing the position of the reversing switch, the instrument will indicate the reference value, which is indicative of the desired trigger response. Hence, the same instrument which indicates regularly the measuring variable being supervised, will indicate the reference value as used for determining the level of trigger response. Such calibrating and adjusting operation is carried out by changing the position of the reversing switch; the reference input can be adjusted under direct utilization of the indication as provided by that instrument.

If, for example, the variable to be measured and supervised is presented in the form of an impressed current, the measuring and indicating instrument is incorporated in the signal line which connects the second input of the amplifier with the reversing switch, while the input is connected additionally via resistance to ground potential. If the variable is a voltage the instrument can be connected directly with one terminal to the second input of the amplifier and to the output thereof when the reversing switch has position for trigger level adjustment.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
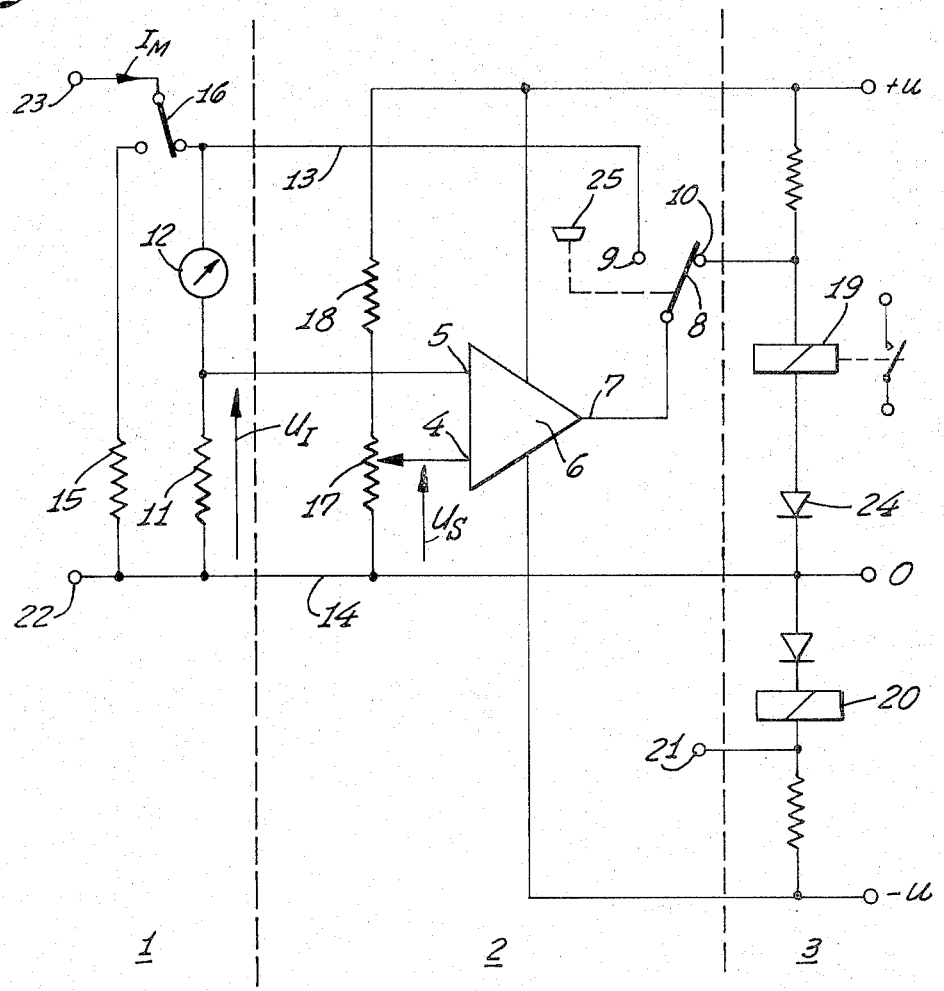
FIG. 1 is a circuit diagram for an example of the preferred embodiment of the invention when used for monitoring and supervising an electric current.

The system and apparatus for supervising and monitoring an electric current $I_M$ is seen essentially to comprise a measuring unit 1 with an indicating instrument 12 flown through by the current $I_M$; an amplifying stage 2 is connected to unit 1 and includes a differential amplifier 6 as well as a reversing switch 8. A trigger stage 3 with a relay 19 and/or 20 is connected to unit 2. The supply voltage for amplifying stage 2 and trigger stage 3 is supplied to the terminals $+u$, $-u$ and $o$, the latter being coupled to ground potential.

The current $I_M$ is supplied to input terminals 22 and 23 of measuring unit 1. A lead wire 14 connects terminal 22 to ground connection $o$. The current $I_M$ is conducted through the instrument 12 as well as through a resistance 11, which two elements are connected in series across terminals 22 and 23. Instrument portion 1 includes additionally a switch 16 having normally the illustrated position of operatively coupling current $I_M$ to the units 2 and 3. In the alternative connection of switch 16, current $I_M$ bypasses the various circuit elements and flows through a resistor 16 instead. In this position of switch 16, all the various components (other than 15) are decoupled from measuring current $I_M$.

A potential difference on voltage loop $U_I$ is developed across resistor 11 when flown through by current $I_M$. Voltage $U_I$ is proportional to the current $I_M$ accordingly, and is supplied to the inverting input 5 of differential amplifier 6. A potentiometer 17 is connected in series with a resistance 18 between ground line 14 and terminal $+u$. A constant voltage $U_S$ is provided by the potentiometer, and is adjustably coupled to the non-inverting input 4 of amplifier 6, the latter being a high-gain amplifier of the integrated circuit variety. Voltage $U_S$ represents the reference or trigger value for the system.

A voltage difference of a few millivolts as supplied in either positive or negative polarity to the inputs of amplifier 6, produces a maximum positive or negative output voltage at an output terminal 7 of the amplifier. In other words, the amplifier readily saturates. The output terminal 7 of amplifier 6 feeds to one terminal of a reversing switch 8. Switch 8, when in the illustrated position (engaging terminal 10) connects amplifier output terminal 7 to one side of a relay 19. In the alternative position, switch 8 connects terminal 7 to a contact 9, which in turn connects to a line 13. Line 13 connects to terminal 23, or it can be said that line 13 provides a connection via instrument 12 to input terminal 5 of the amplifier.

As long as the voltage $U_I$, being proportional to the controlled variable $I_M$, does not exceed the value of the selected reference input $U_S$, a positive output voltage is applied to relay 19, provided the switch arm 8 engages contact 10 as shown, so that the relay 19 energizes. Whenever the voltage $U_I$ exceeds the value of the selected reference input $U_S$, $U_I \geq U_S$, the output voltage of amplifier 6 will be zero or negative, and the relay will be deenergized because the diode 24 prevents reverse current flow in the relay. When deenergized, relay 19 triggers an alarm signal and turns on, e.g. a warning lamp. Thus, relay 19 is connected in normally closed-circuit, but opens when energized. An analogous circuit in normal open contact configuration is represented by a relay 20 for which case contact 21 is connected with contact 10 of the switch. That relay 20 may be used in lieu of or in addition to relay 19 so as to provide for redundancy. Instead of the arrangement shown, the relays, 19, 20, may be operated in combination with special transistorized switching stages.

For setting and indication of the reference input which requires a switching operation, the positions of switches 8 and 16 are reversed, for example, by means of depressing a non-locking push-button 25. As a result, the output current of the amplifier 6 is conducted through the instrument 12 instead of the measuring current $I_M$, while the measuring current $I_M$ bypasses the system through resistor 15. The amplifier 6 produces a strong negative feedback which operates to reduce to practically zero the input voltage differential because the amplifier 6 has high gain and saturates already easily for small input differentials. The saturation current must be at least as large as the largest current $I_M$ expected to represent a desired trigger and alarm level. Under these conditions, a potential is now established at terminal 5 which is equal to $U_S$. The resulting current now being driven through the indicating instrument is that current which, under normal operation performances, should cause change in contact making as far as relay 19 or 20 is concerned. Thus, by manipulating the push-button (operating switches 8 and 16), the instrument 12 shows the reference input. In case a new limit or trigger value is to be set, the setting of the tap of potentiometer 17 can be adjusted, while the instrument indicates the respective newly adjusted limit or critical value to be used as reference thereafter. With this arrangement, the potentiometer does not require a special calibrating scale. Upon releasing the push-button 25, instrument 12 will again indicate the actual measuring current. The impressed measuring current remains unchanged during the switch-over operation when diverted through resistor 15, if the resistance thereof is the same as the resistance of 11 and 12 combined (the current flow into the high-gain amplifier is negligible).

Figure 2:
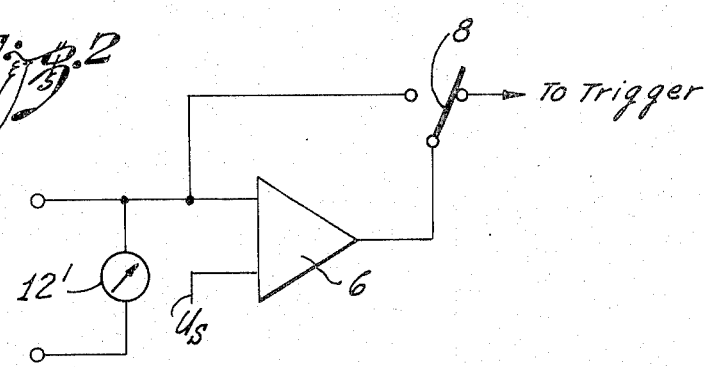
FIG. 2 shows a modification of the circuit as shown in FIG. 1 for monitoring and supervising an electric voltage.

The system may not necessarily need switch 16 and resistance 15. Upon actuating switch 8 above, the measuring current in the instrument 12 is augmented by the amplifier output current so that the instrument does, in fact, indicate the reference input. In other words, the amplifier 6 drives an "error signal" current through instrument 12 so that the voltage potential at terminal 5, in fact, equals the potential at terminal 5 (not completely, but amplifier 6 has high gain so that the residual error is marginal). The instrument will indicate the constant reference input current under these self-compensating operations, even if $I_M$ varies during the adjustment operation for the limit and trigger level on potentiometer 17. In this respect, it is only necessary that the amplifier output is capable of producing the maximum value of the measuring current in positive and negative direction. However, the measuring current flowing through the external circuit is not effected by the switch-over operation, because little current is diverted into the unit 2. If a voltage, instead of a current, is to be measured and supervised, the resistance 11 may be omitted, and voltage meter instrument 12' connects directly across terminals 22, 23. Under these conditions, terminals 5 and 9 are directly interconnected by the line 13. This modification is shown in FIG. 2.

The invention is not limited to the embodiments described above but all changes and modifications thereof not constituting departures from the spirit and scope of the invention are intended to be included.

I claim:

1. Apparatus for monitoring and supervising an electrical signal representing a variable comprising:

a differential high-gain amplifier having a first, noninverting input, a second, inverting input, and an output;

adjustable means for providing an adjustable and predeterminable reference signal and connected to said first input for applying the reference signal thereto;

means for applying said signal representing said variable to said second input, said amplifier providing an output signal representing the difference between the signal representing the variable and the reference signal;

a signal measuring and indicating instrument for monitoring the value of the signal applied to said second input, a switch operable at random and being coupled to said amplifier output, said switch having a first switching position and a second switching position;

a trigger stage coupled to said switch and connected therewith to the output of the amplifier when said switch is in said first switching position for receiving the output of the amplifier and responding when said difference changes polarity; and d.c. circuit means connecting said output to said measuring and indicating instrument and to said second inverting input of said amplifier in d.c. circuit connection when said switch is in said second position for obtaining a negative feedback configuration for the reference signal independent of the reference signal at said first input, so that upon adjustment of the reference signal, the value of the reference signal, is indicated by the instrument, the adjusted reference signal remaining continually effective on the first input after the switch has been returned to the first position.

2. Apparatus as in claim 1 wherein the variable is a current flowing through a resistor and the signal measuring and indicating instrument connected in series, a voltage across the resistor being applied to the second input the side of the signal measuring and indicating instrument not connected to the junction being connected to the switch to be coupled to the amplifier output when the switch is in the second position.

3. Apparatus as in claim 1 wherein the variable is a voltage and the signal measuring and indicating instrument is connected across the voltage, the second input and the switch being connected to one terminal of the instrument so that the voltage is effective on the second input, and the amplifier output is connected thereto in the second position of the switch.

* * * * *